(12) United States Patent  
Chen

(10) Patent No.: US 7,536,483 B2  
(45) Date of Patent: May 19, 2009

(54) COMPUTER SYSTEM HAVING ANALOG AND DIGITAL VIDEO SIGNAL OUTPUT FUNCTIONALITY, AND COMPUTER DEVICE AND VIDEO SIGNAL TRANSMITTING DEVICE THEREOF

(75) Inventor: Yuang-Chih Chen, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 216 days.

(21) Appl. No.: 11/590,429

(22) Filed: Oct. 30, 2006

(65) Prior Publication Data

US 2007/0260785 A1 Nov. 8, 2007

(30) Foreign Application Priority Data

Apr. 3, 2006 (CN) .............................. 95 1 11787

(51) Int. Cl.
*G06F 13/00* (2006.01)
*G06F 3/00* (2006.01)
*H01R 29/00* (2006.01)
*H01R 27/00* (2006.01)

(52) U.S. Cl. ..................... 710/2; 710/1; 710/8; 710/21; 710/62; 710/63; 710/64; 710/72; 710/73; 710/100; 710/300; 439/43; 439/46; 439/49; 439/217; 439/222; 439/445; 439/494; 439/498

(58) Field of Classification Search ........................ None
See application file for complete search history.

(56) References Cited

U.S. PATENT DOCUMENTS

| | | | |
|---|---|---|---|
| 5,207,586 A | * | 5/1993 | MacGregor et al. ........ 439/76.1 |
| 6,343,957 B1 | | 2/2002 | Kuo et al. |
| 6,790,094 B1 | | 9/2004 | Bergmann et al. |
| 7,123,248 B1 | * | 10/2006 | Lafleur ........................ 345/204 |
| 2002/0149541 A1 | * | 10/2002 | Shin ............................ 345/3.1 |
| 2004/0119731 A1 | * | 6/2004 | Lee .............................. 345/699 |
| 2005/0226617 A1 | * | 10/2005 | Lee et al. ....................... 398/79 |

FOREIGN PATENT DOCUMENTS

GB 2 394 124 4/2004

OTHER PUBLICATIONS

European Search Report for EP 06 25 5991, a corresponding foreign application.

* cited by examiner

*Primary Examiner*—Tanh Q Nguyen
(74) *Attorney, Agent, or Firm*—David N. Lathrop, Esq.; Gallagher & Lathrop

(57) ABSTRACT

A video signal transmitting device having analog and digital video signal output functionality is adapted to transmit a video signal, and has a cable unit, a digital visual interface integrated input port disposed at one end of the cable unit and adapted to receive the video signal, and a digital visual interface output port and an analog video signal output port disposed at the other end of the cable unit. The digital visual interface integrated input port has a first pin set for digital video signals, and a second pin set for analog video signals. The digital visual interface output port is connected to the first pin set through the cable unit, and the analog video signal output port is connected to the second pin set through the cable unit so as to achieve an effect of respectively outputting digital video signals and analog video signals.

2 Claims, 6 Drawing Sheets

COMPUTER SYSTEM HAVING ANALOG AND DIGITAL VIDEO SIGNAL OUTPUT FUNCTIONALITY, AND COMPUTER DEVICE AND VIDEO SIGNAL TRANSMITTING DEVICE THEREOF

CROSS-REFERENCE TO RELATED APPLICATION

This application claims priority of Taiwanese Application No. 095111787, filed on Apr. 3, 2006.

BACKGROUND OF THE INVENTION

1. Field of the Invention

The invention relates to a video signal transmitting device for transmitting video signals between a display and a computer device, more particularly to a computer system that has both analog and digital video signal output functionality to enable dual screen displaying on a digital display and an analog display, and to a computer device and a video signal transmitting device of the computer system.

2. Description of the Related Art

Conventional computer devices generally use a video signal transmission line to connect to a display so as to transmit video signals to the display. Currently, there are two types of video signals, i.e., analog video signals and digital video signals. A conventional analog video signal transmission port is D-Sub, which is used, e.g., in a conventional cathode ray tube (CRT) display. A digital video signal transmission port is a digital visual interface (DVI) for use in, e.g., a liquid crystal display.

Although the image display quality of digital video signals is better and will become a mainstream in the future, since analog video devices have been popular for a long time, many users still have displays or computer devices that use analog video signals. In order to be compatible with specifications of existing analog video signal transmission ports, recently launched displays or computer devices, in addition to having a digital video signal transmission port, still need to be provided with an analog transmission port or to be used in conjunction with a video signal transmission line having an adapting or converting function, such as DVI TO VGA.

Furthermore, with the image processing capability of the conventional computer device becoming more and more powerful, the computer device can now support dual screen output displaying via a one-to-two video signal transmission line or two video signal transmission ports provided at a rear part of the computer device. However, dual screen output displaying which uses a one-to-two video signal transmission line requires the video signal transmission ports of two associated displays to have the same specification, i.e., both are for either analog video signals or digital video signals. Dual screen displaying is not possible with one display device supporting analog video signals and the other supporting digital video signals, which can be inconvenient to the user.

SUMMARY OF THE INVENTION

Therefore, the object of the present invention is to provide a computer system having analog and digital video signal output functionality to enable dual screen displaying on different specifications of displays, and a computer device and a video signal transmitting device of the computer system.

Accordingly, the video signal transmitting device having analog and digital video signal output functionality of the present invention is adapted to transmit video signals, and includes a cable unit, a digital visual interface integrated input port, a digital visual interface output port, and an analog video signal output port. The digital visual interface integrated input port is disposed at one end of the cable unit, and is adapted to receive the video signals. The digital visual interface integrated input port has a first pin set for digital video signals, and a second pin set for analog video signals. The digital visual interface output port is disposed at the other end of the cable unit, and is connected to the first pin set through the cable unit. The analog video signal output port is disposed at the other end of the cable unit, and is connected to the second pin set through the cable unit.

Thus, the video signal transmitting device having analog and digital video signal output functionality of the present invention can output digital video signals and analog video signals simultaneously for respective use by a digital display and an analog display, so that displays of different specifications can be used at the same time to perform dual screen displaying.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
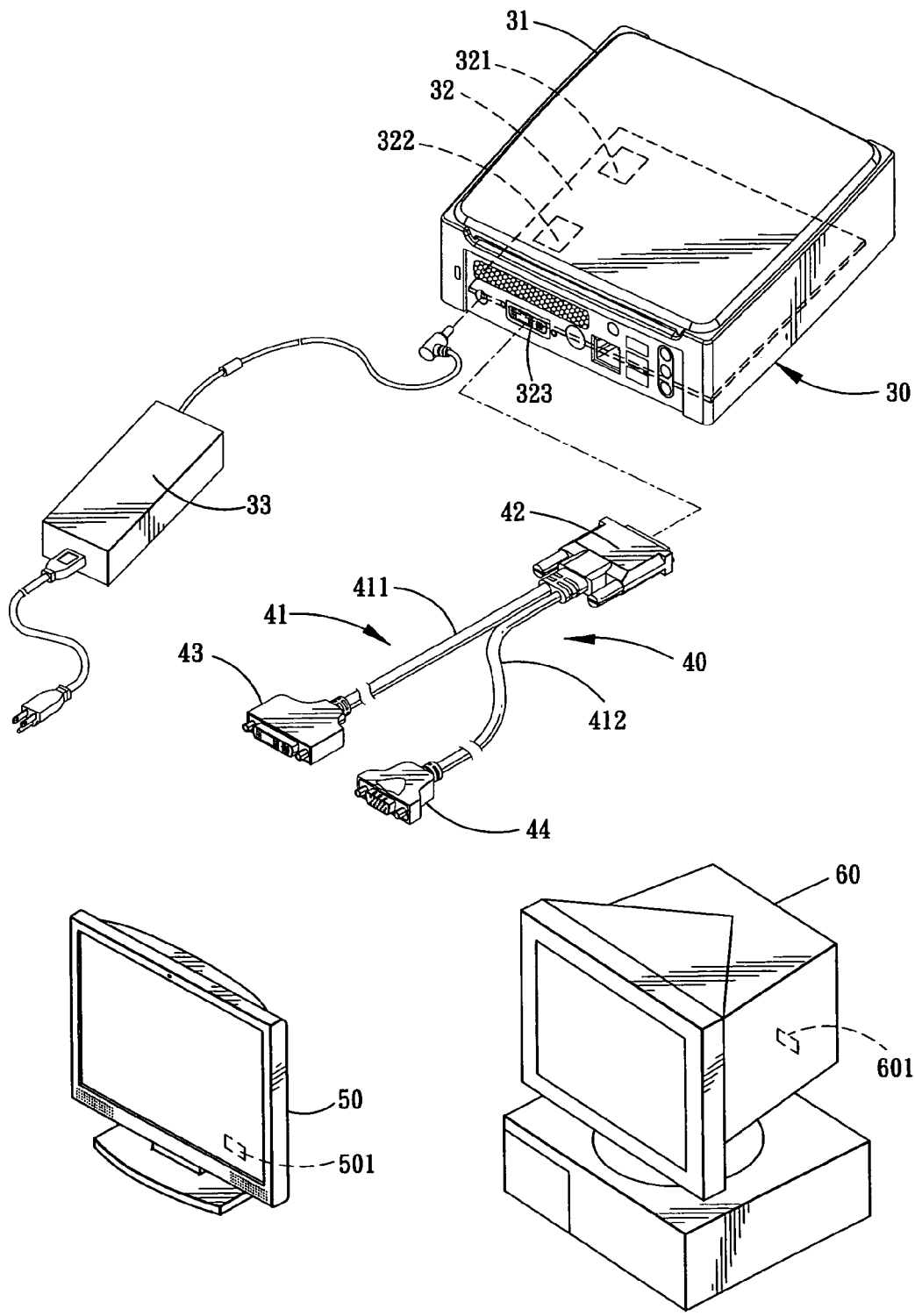
FIG. 1 is an exploded perspective view of the preferred embodiment of a computer system having analog and digital video signal output functionality according to the present invention.

Referring to FIG. 1, the preferred embodiment of a computer system having both analog and digital video signal output functionality according to this invention is shown to include a computer device 30, a video signal transmitting device 40, and a digital display 50, such as a liquid crystal display (LCD), and an analog display 60, such as a cathode ray tube (CRT) display.

The computer device 30 has a housing 31 and a motherboard 32 received in the housing 31. It is noted that the computer device 30 further has other basic computer components, such as a microprocessor (not shown), a power supply 33, a memory (not shown), etc., and should not be limited to the disclosure of the preferred embodiment herein.

Figure 2:
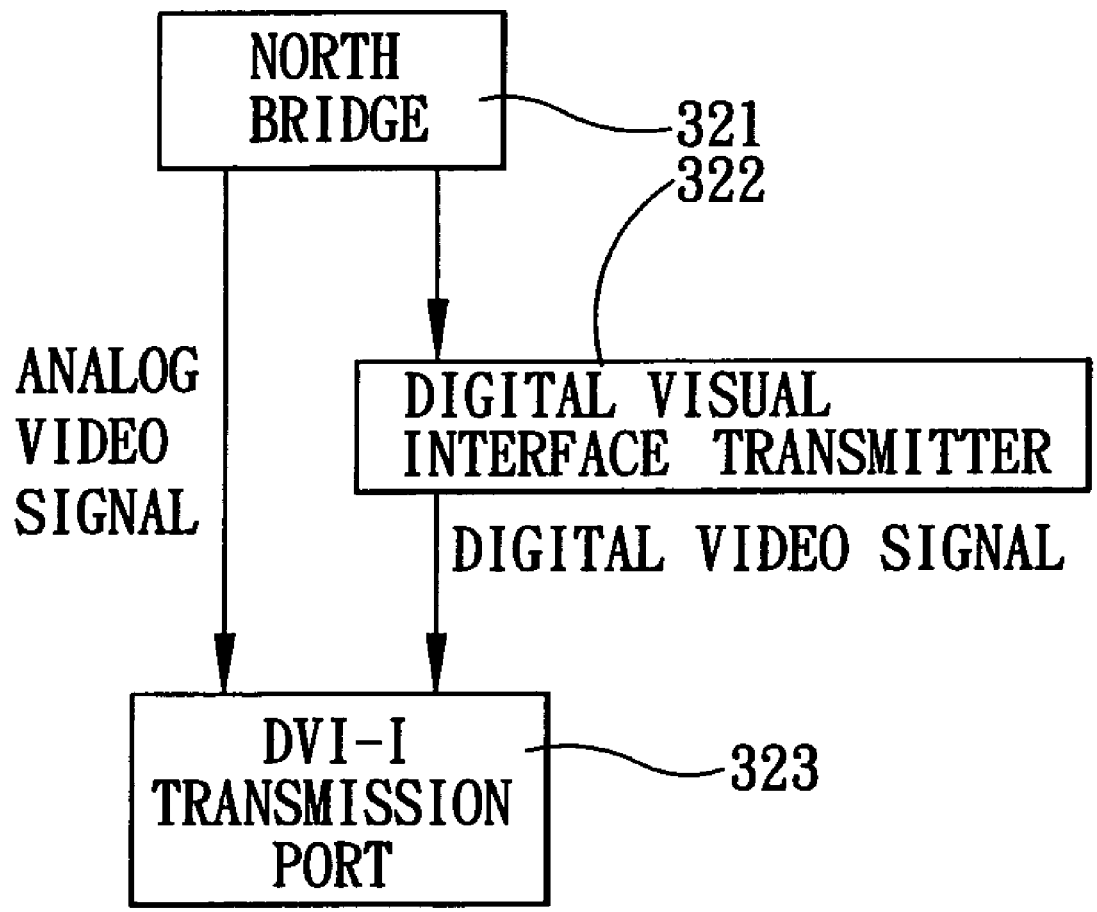
FIG. 2 is a schematic diagram to illustrate video signal transmission in a motherboard of the preferred embodiment.

A conventional digital visual interface (DVI) is configured to transmit digital video signals, and is also configured to transmit analog video signals. For instance, a DVI-Integrated (DVI-I) transmission port can transmit both digital and analog video signals. Therefore, the computer device 30 of this preferred embodiment employs a DVI. Specifically, referring to FIGS. 1 and 2, the motherboard 32 has a North Bridge 321 responsible for video, a digital visual interface (DVI) transmitter 322, and a DVI-I transmission port 323 for connecting with the video signal transmitting device 40. The DVI-I transmission port 323 has a first pin set for digital video signals, and a second pin set for analog video signals. The North Bridge 321 sends the digital video signals to the DVI transmitter 322 for format conversion, and the converted digital video signals are sent to the first pin set. The North Bridge 321 sends the analog video signals to the second pin set. Thus, the DVI-I transmission port 323 can output both digital and analog video signals.

In order to support a plug-and-play functionality, a main communications interface between the displays 50, 60 and the computer device 30 is a display data channel (DDC). The DDC is set by the Video Electronic Standards Association (VESA) responsible for establishing video signal standards in the industry, and permits transmission of a series of numerical signals from the display 50 or 60 to the computer device 30. These numerical signals include basic product identification, basic parameters, and display specification. When the computer device 30 detects such information, it will perform automatic configuration to display an optimum resolution so as to transmit the most suitable video signals to the display 50 or 60. Therefore, the first pin set of the conventional DVI-I transmission port is configured to have pins for transmitting DDC signals so that the computer device 30 can enable the digital display 50 to correctly display digital video signals. However, the second pin set for analog video signals of the conventional DVI-I transmission port is not configured to transmit DDC signals so that the computer device 30 may not be able to allow the analog display 60 to properly display analog video signals.

Figure 3:
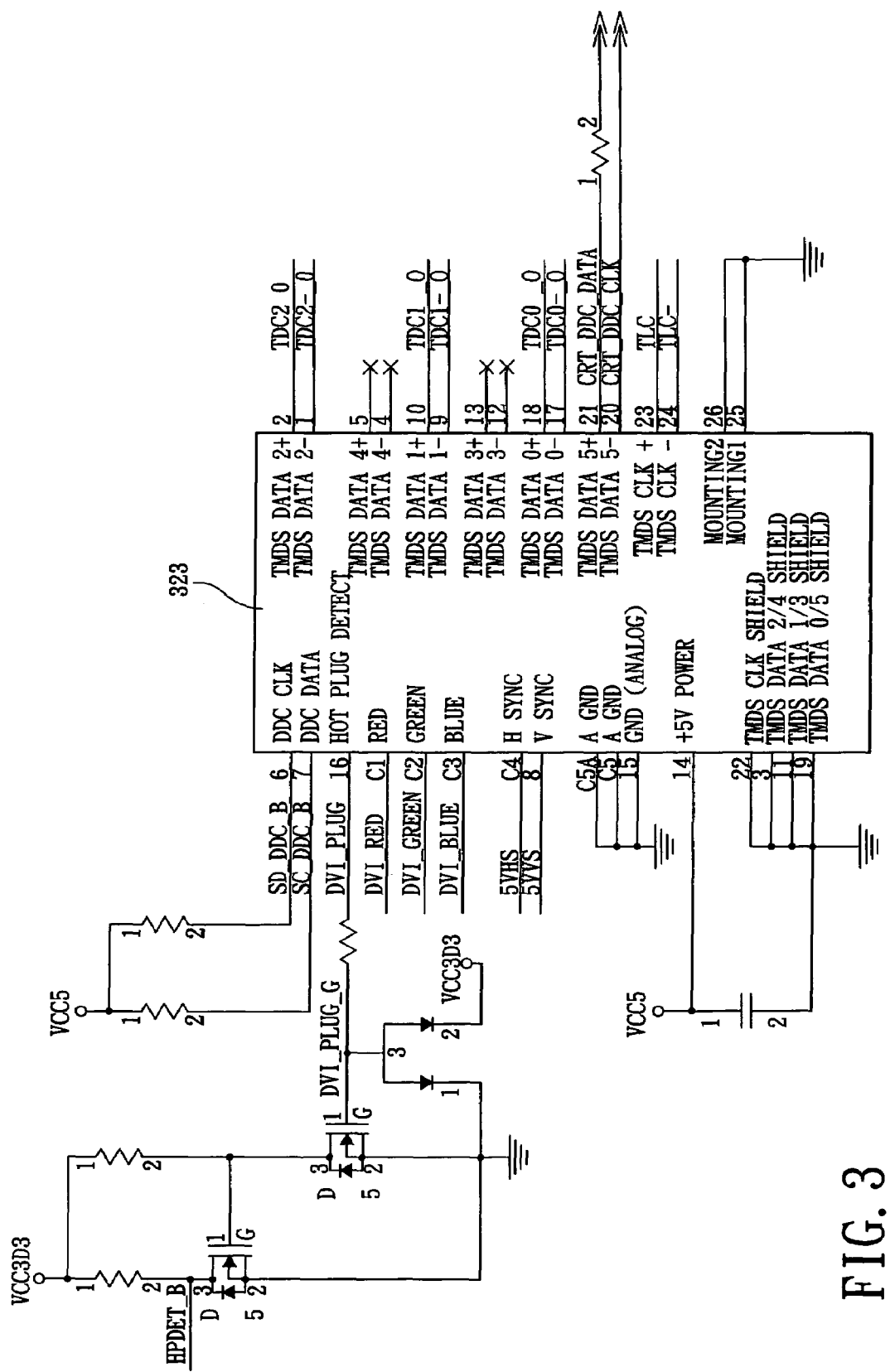
FIG. 3 is a schematic diagram to illustrate a pin layout of a DVI-I transmission port of the preferred embodiment.
Figure 4:
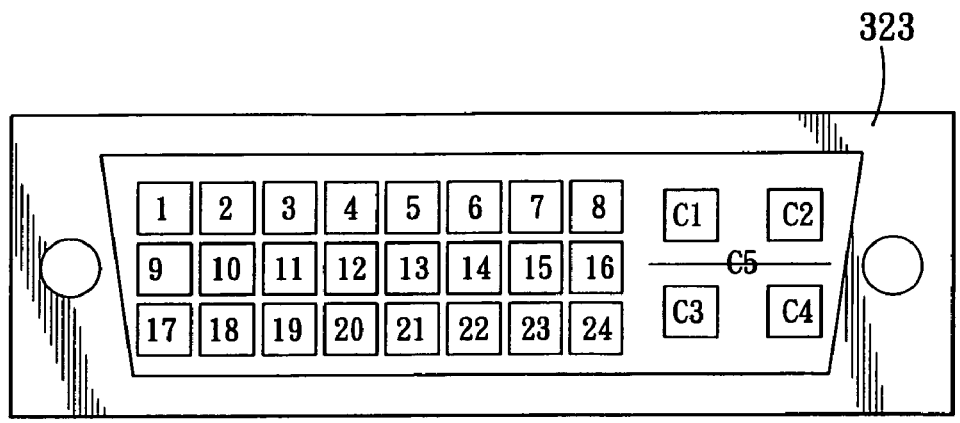
FIG. 4 is a schematic diagram to illustrate the pins of the DVI-I transmission port of the preferred embodiment.

Furthermore, although the first pin set of the conventional DVI-I transmission port is generally configured with two TDMS channels, since use of two TDMS channels requires the determination and conversion of the timing of use of the TDMS channels in real time, the design is comparatively complicated. Besides, the image resolution when one TDMS channel is used is already sufficient. For example, when a TDMS channel is used for transmission, at a screen updating speed of 85-Hz, the resolution may reach 1280*1024 (SXGA). When the screen updating speed is reduced to 60-Hz, the resolution can even reach 1600*1200 (UXGA). Therefore, generally, only one TDMS channel is actually used in practice. The other TDMS channel is allowed to lie idle. Accordingly, the preferred embodiment configures two pins of the idle TDMS channel for transmitting DDC signals for analog video signals to the North Bridge 321. Thus, the pin definitions as indicated in FIGS. 3 and 4 and the following table are different from those of the conventional DVI-I transmission ports. The second pin set of the DVI-I transmission port 323 of the preferred embodiment is configured to include pins 20, 21 for transmitting DDC signals, i.e., the pins 20, 21 are used as pins for a display data channel, in which the pin 20 is a clock pin and the pin 21 is a data pin. It is noted that some grounding pins, such as pins 5, C5, etc., are shared by the first pin set and the second pin set.

|  | PIN | PIN DEFINITION | FUNCTION |
|---|---|---|---|
| First pin set | 01 | TMDS DATA 2− | Digital video signal TDC2-0, i.e., the first TDMS channel |
|  | 02 | TMDS DATA 2+ | Digital video signal TDC2 0, i.e., the first TDMS channel |
|  | 03 | TMDS DATA 2/4 SHIELD | Grounding |
|  | 04 | TMDS DATA 4− | Idle, i.e., the second TDMS channel |
|  | 05 | TMDS DATA 4+ | Idle, i.e., the second TDMS channel |
|  | 06 | DDC CLK | DDC clock of digital video signal |
|  | 07 | DDC DATA | DDC data of digital video signal |
|  | 09 | TMDS DATA 1− | Digital video signal TDC1-0, i.e., the first TDMS channel |
|  | 10 | TMDS DATA 1+ | Digital video signal TDC1 0, i.e., the first TDMS channel |
|  | 11 | TMDS DATA 1/3 SHIELD | Grounding |
|  | 12 | TMDS DATA 3− | Idle, i.e., the second TDMS channel |
|  | 13 | TMDS DATA 3+ | Idle, i.e., the second TDMS channel |
|  | 14 | +5 V Power | For use by DDC of digital video signal |
|  | 15 | GND (ANALOG) | Grounding |
|  | 16 | Hot Plug Detect | Hot plug detection |
|  | 17 | TMDS DATA 0− | Digital video signal TDC0-0, i.e., the first TDMS channel |
|  | 18 | TMDS DATA 0+ | Digital video signal TDC0 0, i.e., the first TDMS channel |
|  | 19 | TMDS DATA 0/5 SHIELD | Grounding |
|  | 22 | TMDS CLK SHIELD | Grounding |
|  | 23 | TMDS CLK+ | Clock TLC of digital video signal |
|  | 24 | TMDS CLK− | Clock TLC of digital video signal |
|  | 25 | Mounting1 | Grounding |
|  | 26 | Mounting2 | Grounding |
|  | C5 | A GND | Grounding |
| Second Pin Set | 08 | V SYNC | Vertical synchronization signal of analog video signal |
|  | 15 | GND (ANALOG) | Grounding |
|  | 20 | TMDS DATA 5− | DDC clock of analog video signal, i.e., the second TDMS channel |
|  | 21 | TMDS DATA 5+ | DDC data of analog video signal, i.e., the second TDMS channel |
|  | C1 | RED | Red signal |
|  | C2 | GREEN | Green signal |
|  | C3 | BLUE | Blue signal |
|  | C4 | H SYNC | Horizontal synchronization signal of analog video signal |
|  | C5 | A GND | Grounding |
|  | C5A | A GND | Grounding |

Hence, when the North Bridge 321 outputs analog video signals, pins 20, 21 of the second pin set can be used to acquire the DDC of the analog display 60 so as to ensure that the analog display 60 can display normally.

As shown in FIG. 1, the video signal transmitting device 40 of the preferred embodiment is a one-to-two video signal transmission line, and has a cable unit 41, a digital visual interface integrated input port 42, a digital visual interface output port 43, and an analog video signal output port 44.

The digital visual interface integrated input port 42 cooperates with and has the same specification as the DVI-I transmission port 323 of the computer device 30, and has a first pin set and a second pin set that have the same definitions as those set forth in the above table, and that are used for connection with the DVI-I transmission port 323 to receive video signals from the computer device 30, i.e., the pin layout of the digital visual interface integrated input port 42 is the same as the pin layout of the DVI-I transmission port 323 shown in FIG. 4. The cable unit 41 has two transmission lines 411, 412. The transmission line 411 enables the pins of the digital visual interface output port 43 to be electrically connected to the first pin set, whereas the transmission line 412 enables the pins of the analog video signal output port 44 to be electrically connected to the second pin set.

Figure 5:
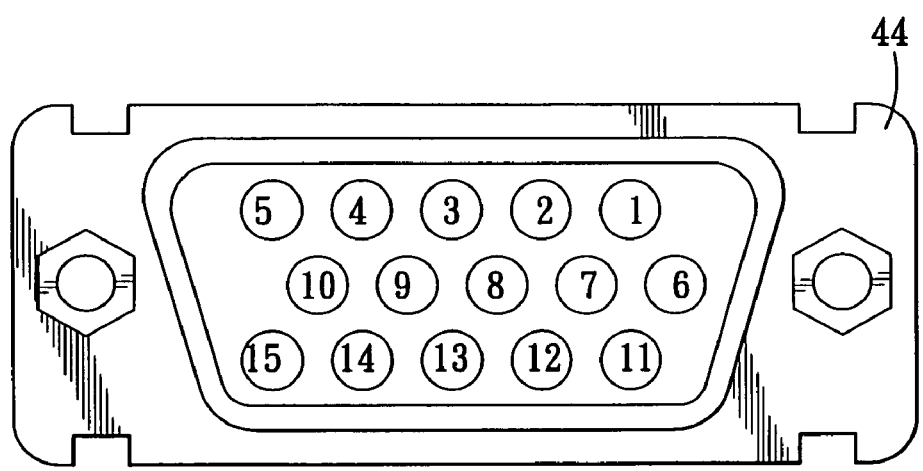
FIG. 5 is a schematic diagram to illustrate pins of an analog video signal output port of the preferred embodiment.
Figure 6:
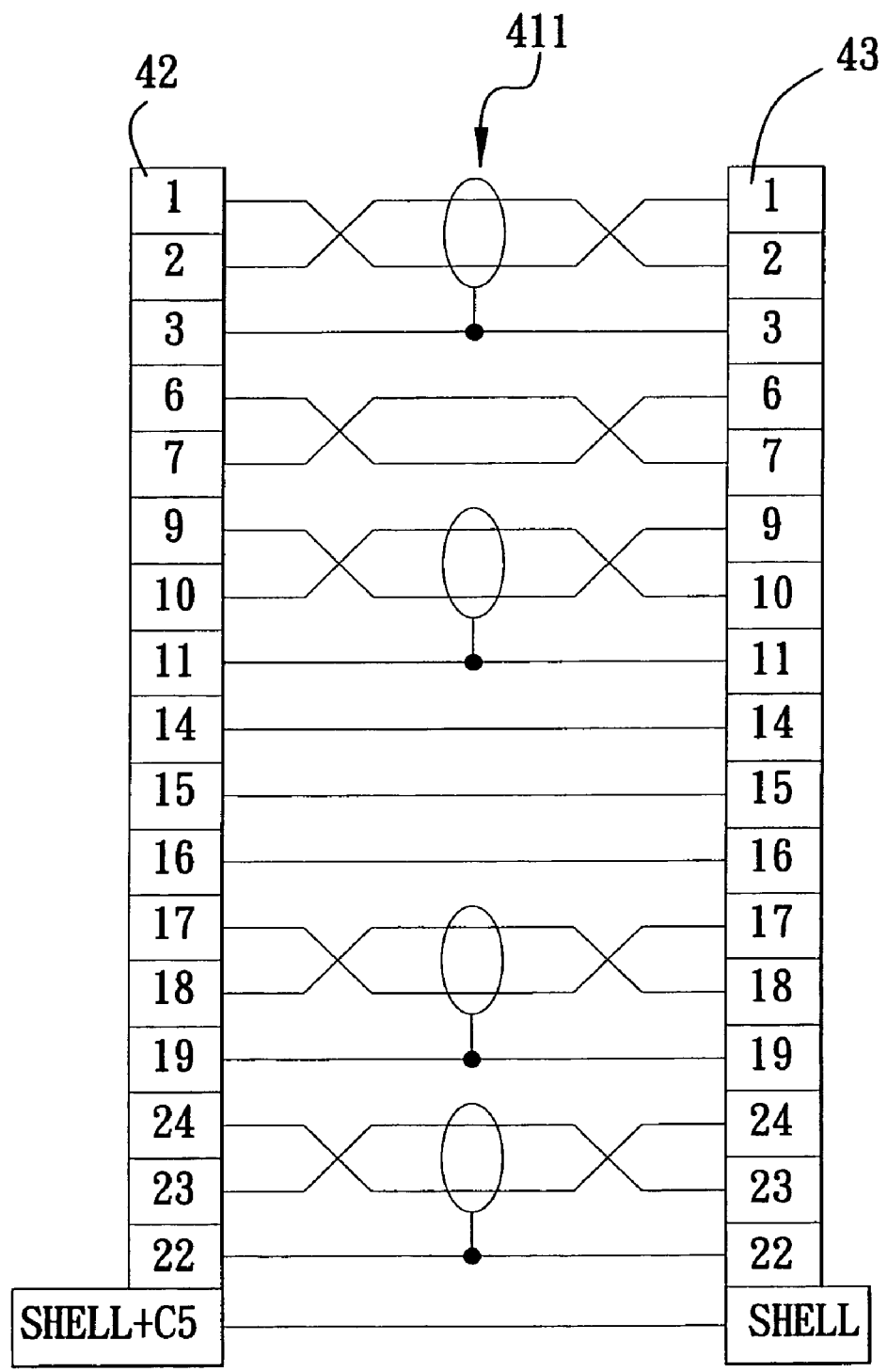
FIG. 6 is a schematic diagram to illustrate wiring of a transmission line connecting a digital visual interface integrated input port to a digital visual interface output port in a video signal transmitting device of the preferred embodiment.
Figure 7:
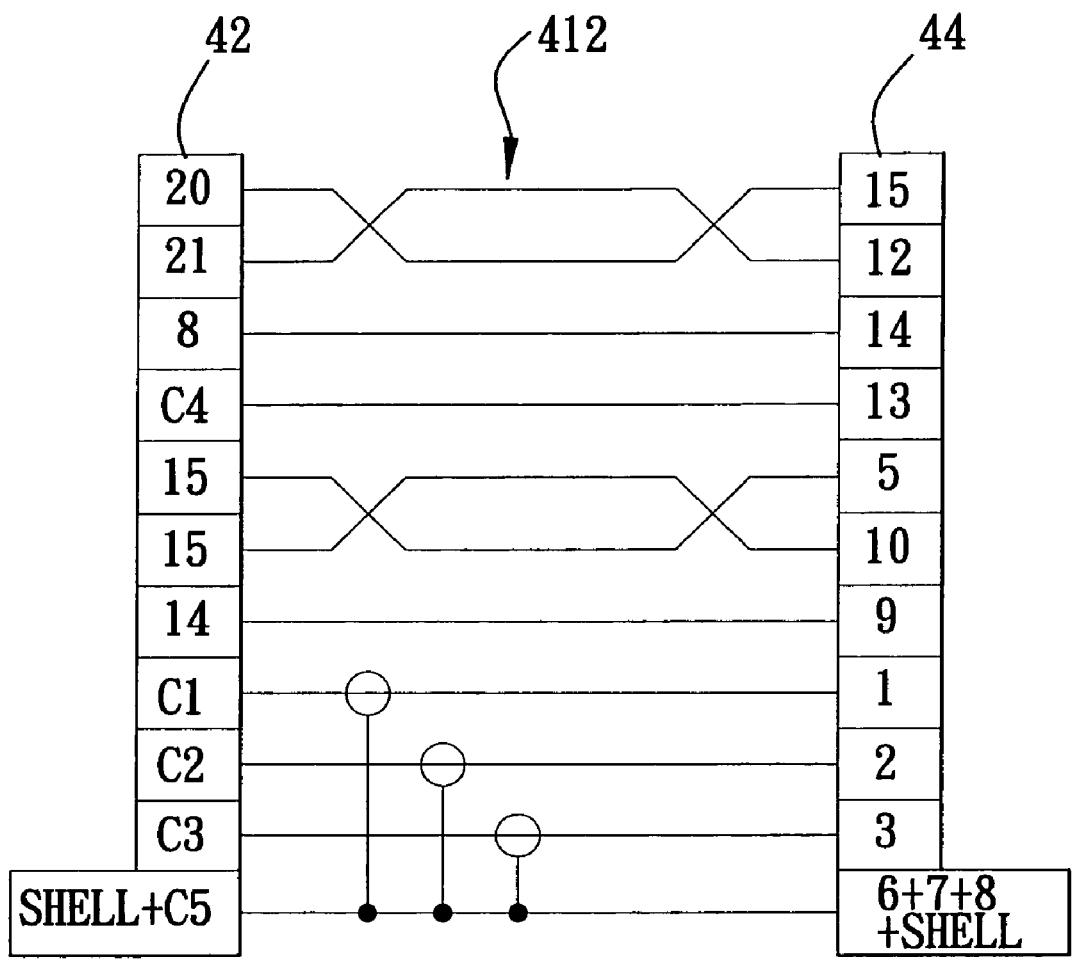
FIG. 7 is a schematic view to illustrate wiring of a transmission line connecting the digital visual interface integrated input port to an analog video signal output port in the video signal transmitting device of the preferred embodiment.

In this embodiment, the specification of a transmission port 501 of the digital display 50 is digital visual interface digital (DVI-Digital, hereinafter referred to as DVI-D). The specification of the digital visual interface output port 43 may be DVI-I or DVI-D. In this embodiment, the digital visual interface output port 43 is DVI-I, whereas the specification of a transmission port 601 of the analog display 60 is D-Sub. Therefore, as shown in FIG. 5, the specification of the analog video signal output port 44 is also D-Sub. As shown in FIG. 6, the transmission line 411 connects the first pin set of the digital visual interface integrated input port 42 to the digital visual interface output port 43, and the idle pins 4, 5, 12, and 13 of the first pin set are not connected to the digital visual interface output port 43. Furthermore, as shown in FIG. 7, the transmission line 412 connects the second pin set of the digital visual interface integrated input port 42 to the pins of the analog video signal output port 44. Moreover, to ensure better signal transmission, as shown in FIGS. 6 and 7, in this embodiment, pairs of adjacent lead wires in the transmission line 411 for connecting pairs of pins 1 and 2, 6 and 7, 9 and 10, 17 and 18, and 23 and 24 in the digital visual interface integrated input port 42 which are provided for transmitting digital video signals, DDC and clock signals, respectively, are intertwined, and pairs of adjacent lead wires in the transmission line 412 for connecting pairs of pins 15 and 12, and 5 and 10 in the analog video signal output port 44 which are provided for transmitting DDC and grounding signals, respectively, are intertwined.

As shown in FIG. 1, accordingly, the computer device 30 only needs to be provided with a single DVI-I transmission port 323 in combination with a video signal transmitting device 40 to permit displaying through one or both of the digital display 50 and the analog display 60. Specifically, when the preferred embodiment is employed in conjunction with the digital display 50, it is only necessary to connect the digital visual interface integrated input port 42 of the video signal transmitting device 40 to the DVI-I transmission port 323 of the computer device 30, and to connect the digital visual interface output port 43 to the transmission port 501 of the digital display 50. After reading the DDC of the digital display 50, the North Bridge 321 of the computer device 30 sends the digital video signals to the DVI transmitter 322 for format conversion, and the converted digital video signals are sent to the digital display 50 via the video signal transmitting device 40 for display. On the other hand, when the preferred embodiment is used in conjunction with the analog display 60, the digital visual interface integrated input port 42 of the video signal transmitting device 40 has to be connected to the DVI-I transmission port 323 of the computer device 30, and the analog video signal output port 44 is connected to the transmission port 601 of the analog display 60. The computer device 30 reads the DDC of the analog display 60, and correct analog video signals are sent to the analog display 60 for display. Furthermore, when it is desired to conduct dual screen output displaying, the digital visual interface integrated input port 42 of the video signal transmitting device 40 is connected to the DVI-I transmission port 323 of the computer device 30; the digital visual interface output port 43 is connected to the transmission port 501 of the digital display 50; and the analog video signal output port 44 is connected to the transmission port 601 of the analog display 60. The computer device 30 will first read the DDC of the digital display 50 and the analog display 60, and send the correct digital video signals and analog video signals through the video signal transmitting device 40 to the digital display 50 and the analog display 60, respectively, for displaying, thereby achieving the purpose of displaying on the screens of two displays 50, 60 that have different specifications.

Given the foregoing, the computer system having dual outputs of analog and digital video signals according to the present invention configures the second pin set of the DVI-I transmission port 323 for analog video signals to have the pins 20, 21 for transmitting DDC signals so that the computer device 30 can be used to read DDC of the analog display 60 so as to correctly drive the analog display 60 for displaying. Furthermore, the computer device 30 used in combination with the video signal transmitting device 40 can cooperate with either the digital display 50 or the analog display 60, or both of the digital display 50 and the analog display 60 to allow dual screen displaying so as to achieve the object of the present invention to permit dual screen displaying on different specifications of displays.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A computer system having analog and digital video signal output functionality, comprising:

a computer device having a housing and a motherboard disposed in said housing, said motherboard including a North Bridge, a digital visual interface (DVI) transmitter connected to said North Bridge, and a single digital visual interface integrated (DVI-I) transmission port, said DVI-I transmission port having a first pin set associated with a first digital channel of said DVI-I transmission port and connected to said DVI transmitter for outputting digital video signals, and a second pin set connected to said North Bridge for outputting analog video signals simultaneously with the output of said digital video signals, said second pin set of said DVI-I transmission port including a pin unit for transmitting data of an analog display data channel signal and a pin unit for transmitting a clock of the analog display data channel signal, said in units being associated with a second digital channel of said DVI-I transmission port; and a video signal transmitting device having a DVI-I input port detachably connected to said DVI-I transmission port, an analog video signal output port, and a cable unit for connecting pins in said DVI-I input port which correspond to said second pin set of said DVI-I transmission port to said analog video signal output port, and a DVI output port that is connected through said cable unit to pins in said DVI-I input port which correspond to said first pin set of said DVI-I transmission port.

2. A computer device having analog and digital video signal output functionality, comprising:

a housing; and a motherboard disposed in said housing, and having a North Bridge, a digital visual interface (DVI) transmitter connected to said North Bridge, and a single digital visual interface integrated (DVI-I) transmission port, said DVI-I transmission port having a first pin set associated with a first digital channel of said DVI-I transmission port and connected to said DVI transmitter for outputting digital video signals, and a second pin set connected to said North Bridge for outputting analog video signals simultaneously with the output of said digital video signals, said second pin set including a pin unit for transmitting data of an analog display data channel signal and a pin unit for transmitting a clock of the analog display data channel signal, said pin units being associated with a second digital channel of said DVI-I transmission port.

* * * * *